(12) United States Patent
Van Der Ham et al.

(10) Patent No.: US 9,097,135 B2
(45) Date of Patent: Aug. 4, 2015

(54) POWER HARVESTING BEARING CONFIGURATION

(71) Applicants: Andreas Clemens Van Der Ham, Utrecht (NL); Frank Bartl, Grenzach-Wyhlen (DE)

(72) Inventors: Andreas Clemens Van Der Ham, Utrecht (NL); Frank Bartl, Grenzach-Wyhlen (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/349,917

(22) PCT Filed: Sep. 27, 2012

(86) PCT No.: PCT/EP2012/069073
§ 371 (c)(1),
(2) Date: Apr. 4, 2014

(87) PCT Pub. No.: WO2013/050292
PCT Pub. Date: Apr. 11, 2013

(65) Prior Publication Data
US 2014/0333070 A1    Nov. 13, 2014

Related U.S. Application Data

(60) Provisional application No. 61/544,107, filed on Oct. 6, 2011.

(51) Int. Cl.
| | | |
|---|---|---|
| *F16C 41/00* | (2006.01) | |
| *F01D 15/10* | (2006.01) | |
| *F16C 35/00* | (2006.01) | |
| *F16C 37/00* | (2006.01) | |
| *F01D 1/04* | (2006.01) | |
| *F04D 29/05* | (2006.01) | |
| *H02K 7/18* | (2006.01) | |

(52) U.S. Cl.
CPC ........ *F01D 15/10* (2013.01); *F01D 1/04* (2013.01); *F04D 29/05* (2013.01); *F16C 35/00* (2013.01); *F16C 37/00* (2013.01); *F16C 41/004* (2013.01); *H02K 7/1823* (2013.01)

(58) Field of Classification Search
CPC .................................................... F16C 41/00
USPC ............................................................ 290/52
See application file for complete search history.

(56) References Cited

U.S. PATENT DOCUMENTS

| | | | | |
|---|---|---|---|---|
| 5,440,184 A | * | 8/1995 | Samy et al. | ...................... 310/90 |
| 5,585,711 A | * | 12/1996 | Kemner et al. | ................. 322/46 |

(Continued)

FOREIGN PATENT DOCUMENTS

| | | |
|---|---|---|
| DE | 102009037424 A1 | 2/2011 |
| JP | 2009005430 A | 1/2009 |
| JP | 2010216651 A | 9/2010 |

*Primary Examiner* — Joseph Waks
(74) *Attorney, Agent, or Firm* — Bryan Peckjian; SKF USA Inc. Patent Dept.

(57) ABSTRACT

A power generating bearing assembly comprising a bearing retained by a bearing housing is provided. The bearing housing includes a bearing cooling passage system comprising at least one integrated liquid cooling passage is integrated within the bearing housing. A turbine assembly is inserted within the integrated liquid cooling passage, wherein fluid flowing within the integrated liquid cooling passage causes a turbine blade subassembly within the turbine assembly to rotate. The rotation of the turbine blade subassembly rotates an electrical power generator to create electrical power. The turbine assembly can be integrated into any existing bearing assembly comprising a bearing cooling passage system. It is preferred to seat the turbine assembly within a cooling system port of the bearing cooling passage system.

11 Claims, 4 Drawing Sheets

(56) References Cited

U.S. PATENT DOCUMENTS

| | | |
|---|---|---|
| 5,711,615 A | 1/1998 | Stitz et al. |
| 6,535,135 B1 * | 3/2003 | French et al. ............ 340/682 |
| 6,682,277 B2 * | 1/2004 | Endo et al. ............ 409/231 |
| 6,838,794 B2 * | 1/2005 | Iwamoto et al. ............ 310/90 |
| 2014/0348453 A1 * | 11/2014 | Bartl et al. ............ 384/476 |
| 2014/0348638 A1 * | 11/2014 | Bartl et al. ............ 415/116 |
| 2014/0360548 A1 * | 12/2014 | Bartl et al. ............ 136/205 |
| 2014/0367970 A1 * | 12/2014 | Van Der Ham et al. ....... 290/52 |

\* cited by examiner

POWER HARVESTING BEARING CONFIGURATION

CROSS-REFERENCE TO RELATED APPLICATIONS

This application is the U.S. National Stage of International Application No. PCT/EP2012/069073 filed on Sep. 27, 2012, which claims priority to U.S. patent application Ser. No. 61/544,107 US filed on Oct. 6, 2011.

Technical Field Of The Invention

The present invention relates to an apparatus and method for generating power utilizing a cooling system integrated into a bearing or bearing housing.

2. Background Art

Bearings are used to support many rotating objects. Bearings are commonly integrated into a variety of machines. The bearings are a key factor contributing to the reliability of the machine. The system designed commonly installs one or more bearing condition monitoring devices to ensure the bearings remain in working order. The majority of the condition monitoring devices requires low voltage electrical power for operation. Some systems include other components that also utilize electrical power.

Batteries provide a limited capacity, which dictates a limited supply and thus a limited run time. Obtaining power from a commercial utility source can be costly, particularly for remote installations. Transferring electrical power from a commercially available source can require running extensive and costly power cabling and support equipment. Maintenance of these systems must be considered. Replacement of batteries incurs both parts and labor costs. These concerns are aggravated for temporary installations.

A portion of the bearings generates a significant amount of heat. These bearings include heat dissipation or thermal transfer systems. One exemplary thermal transfer system includes one or more integrated liquid cooling passages. Liquid coolant is pumped through the integrated liquid cooling passages extracting heat from the bearing or bearing assembly.

Turbines are commonly used for a variety of applications. One application converts energy from a flowing liquid to electrical energy. A well-known example is a windmill Another well-known example is a dam.

More compact, lower level power generators have been integrated into home appliances such as faucets, shower heads, and the like, where power is converted from the flowing water to electrical power, which is subsequently used to illuminate LED's.

A variety of parameters are monitored to continuously determine a condition of a bearing. The application of the bearing may limit the availability or ease of providing electrical power to the sensors used to monitor the condition of the bearing. What is desired is a power generating system that can be integrated into the bearing assembly to harvest power from the bearing assembly and utilize the harvested power to generate electrical energy.

DISCLOSURE OF THE INVENTION

The present invention is directed towards an apparatus and respective method for generating electrical energy utilizing a cooling system of a bearing or bearing assembly.

In a first aspect of the present invention, a power generating bearing assembly, the power generating bearing assembly comprising:
a bearing;
a bearing housing comprising:
a bearing receptacle, and
at least one integrated liquid cooling passage;
a turbine assembly comprising:
a turbine casing,
a turbine shaft assembled within the turbine casing,
a turbine blade subassembly rotationally carried by the turbine shaft, and
an electrical generator in operational engagement with the turbine blade subassembly, wherein rotational motion of the turbine blade subassembly causes the electrical generator to generate electrical power;
wherein the turbine is integrated within the liquid cooling passage and converts energy provided by fluid flowing through the liquid cooling passage to electrical energy.

In a second aspect, the turbine further comprises an electrical conduit extending in electrical communication from the electrical generator.

In another aspect, the turbine casing is provided having a circular cross sectional shape.

In another aspect, the turbine is installed proximate a cooling system inlet port.

In another aspect, the turbine is installed proximate a cooling system discharge port.

In another aspect, the turbine is installed orienting a rotational axis of the turbine substantially parallel to the direction of flow of the fluid.

In another aspect, the turbine is installed orienting the turbine blade subassembly upstream of the fluid flow.

In another aspect, the turbine is installed orienting the turbine blade subassembly downstream of the fluid flow.

In another aspect, the turbine casing further comprises a fluid entry port located at a first end thereof and a fluid entry port located at a second, opposite end thereof.

In another aspect, the electrical power generated is utilized to provide power to a separate electrically powered device.

In another aspect, the electrical power generated is utilized to power at least one bearing condition monitoring sensor.

In another aspect, the electrical power generated is utilized to power at least one bearing condition monitoring sensor associated with the same bearing assembly.

In another aspect, the electrical power generated is utilized to power at least one bearing condition monitoring sensor associated with the same bearing assembly and at least one bearing condition monitoring sensor associated with a separate bearing assembly located proximate the power generating bearing assembly.

One advantage of the present invention is the ability to generate a continued electrical current using a cooling system of a bearing assembly. One or more sensors can be employed to monitor a condition of a bearing. The sensors are commonly operated using electrical power. The sensors can monitor a variety of parameters to continuously determine a condition of a bearing. Communication devices could be employed as a vehicle to transfer information to a remote monitoring facility. These communication devices are also operated using electrical power. It is not uncommon where a system utilizing a bearing would be located in a remote area where sourcing electrical power could be difficult. Bearings can be utilized on equipment deployed in remote locations. The application of the bearing may limit the availability or ease of providing electrical power to the sensors used to monitor the condition of the bearing. The inclusion of an electrical power-generating device within a bearing system eliminates the need for an external source of electrical power. Additionally, by integrating the turbine assembly into the cooling system, the electrical energy is not drawing energy from the rotation of the bearing or other rotating elements of the system. Therefore, the turbine assembly is not impacting the efficiency of the rotating elements of the system.

Another advantage of the present invention is the ease of installation. The installation can be accomplished by inserting the turbine assembly into a cooling system port. The cooling system port can be an inlet port or a discharge port. When necessary, the cooling system port can be enlarged and/or deepened to accommodate the turbine assembly.

The location of condition monitoring sensors could complicate any provisions for externally provided power for monitoring the condition of the bearing. The bearing(s) can be integrated into the equipment at a location that is difficult to access, particularly for wiring. The inclusion of a power generator within the bearing assembly optimizes a source for electrical power at a location proximate the sensors or other equipment requiring the electrical power. This significantly reduces a length of wiring required. The reduced wiring avoids any accidentally interference or abrasion by any rotational movements or other movements of components of the equipment.

Another advantage of the present invention is the ability to deploy a temporary system having an integrated turbine for portable, monitored systems. The solution enables a complete stand-alone wireless system.

These and other features, aspects, and advantages of the invention will be further understood and appreciated by those skilled in the art by reference to the following written specification, claims and appended drawings, which follow.

BRIEF DESCRIPTION OF THE DRAWINGS

For a fuller understanding of the nature of the present invention, reference should be made to the accompanying drawings in which.

Like reference numerals refer to like parts throughout the several views of the drawings.

MODES FOR CARRYING OUT THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
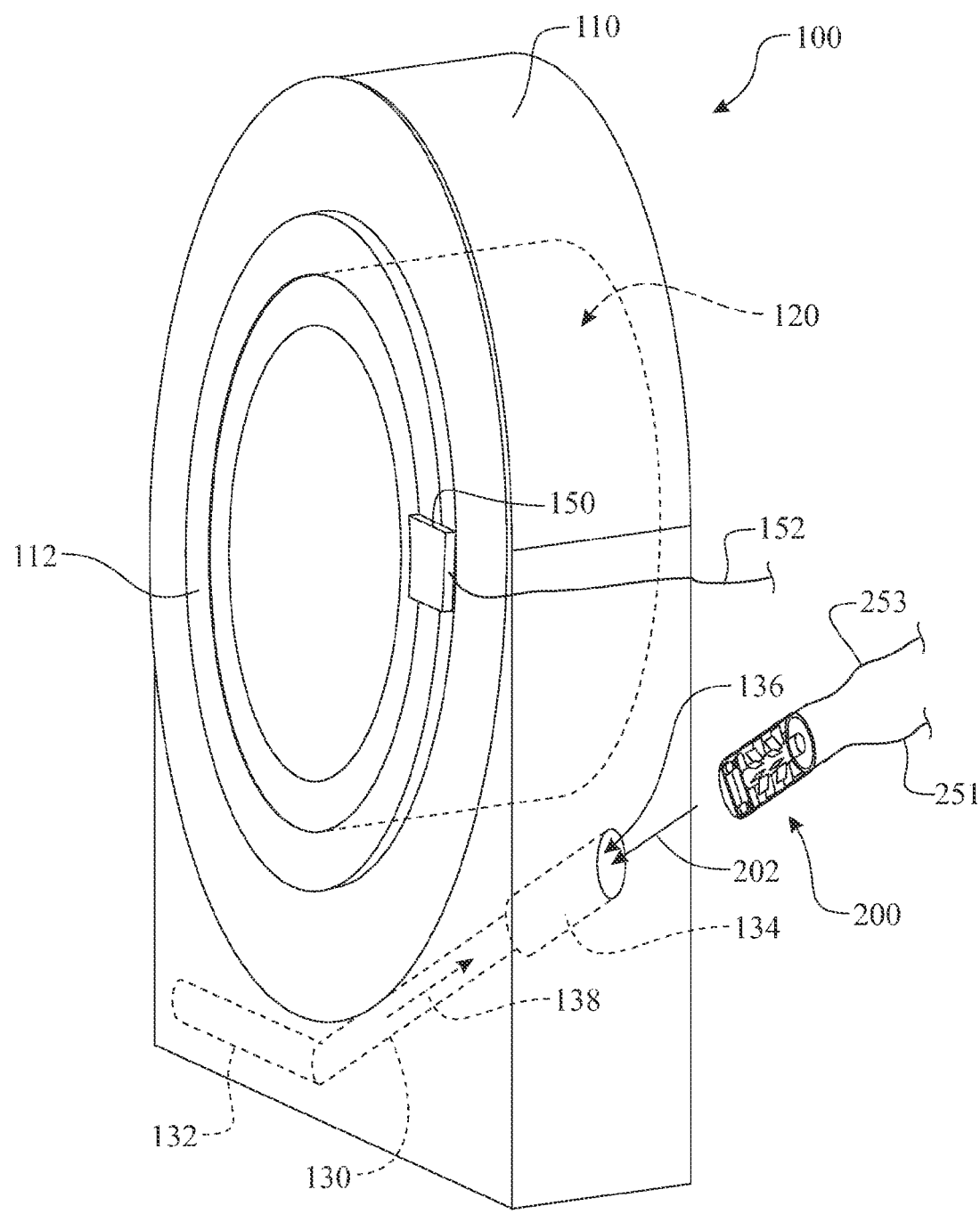
FIG. 1 presents an isometric assembly view of an exemplary turbine assembly being inserted into an integrated liquid cooling segment of a bearing housing.
Figure 2:
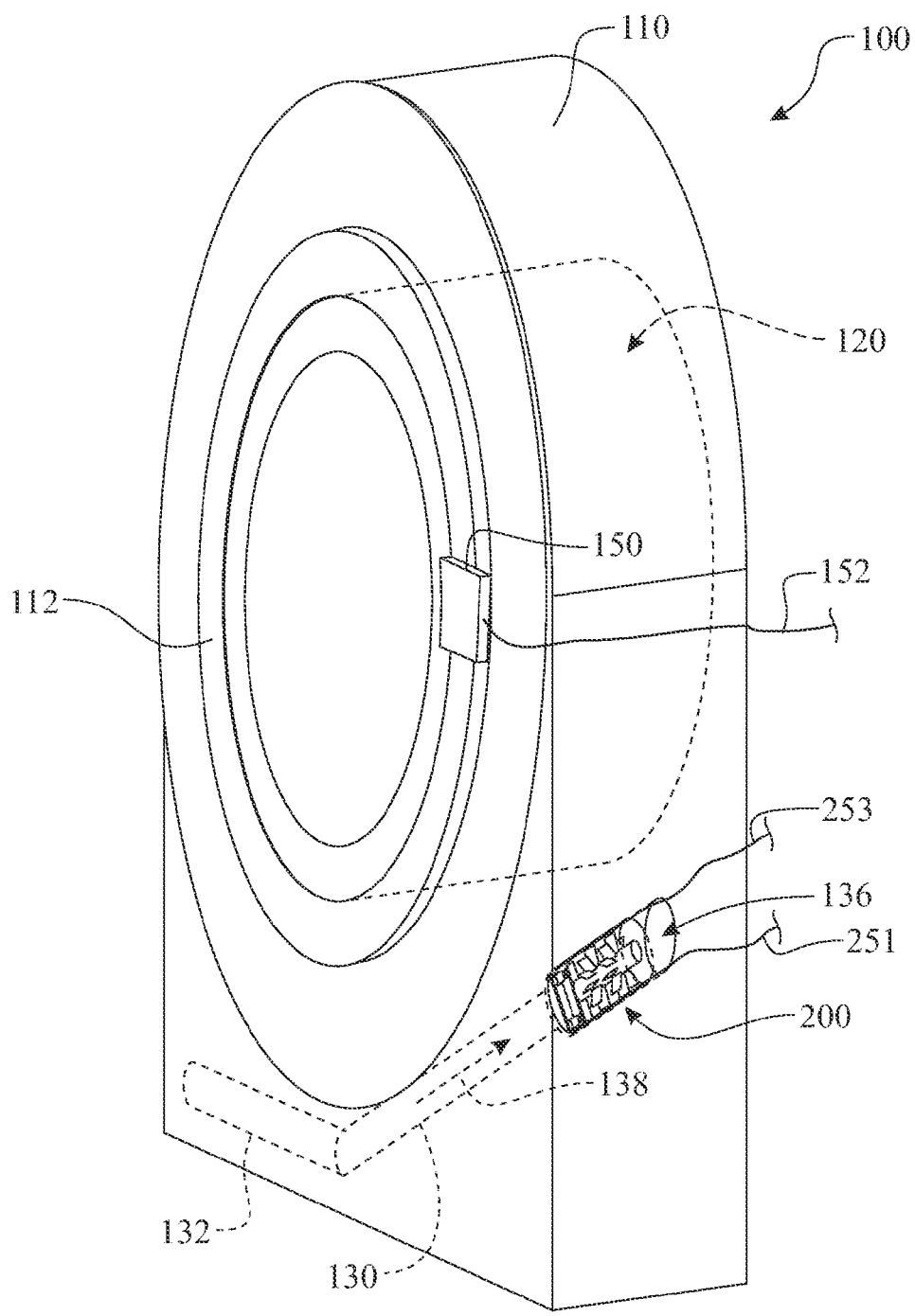
FIG. 2 presents an isometric view of the exemplary turbine assembly shown as installed within the integrated liquid cooling segment of a bearing housing.
Figure 3:
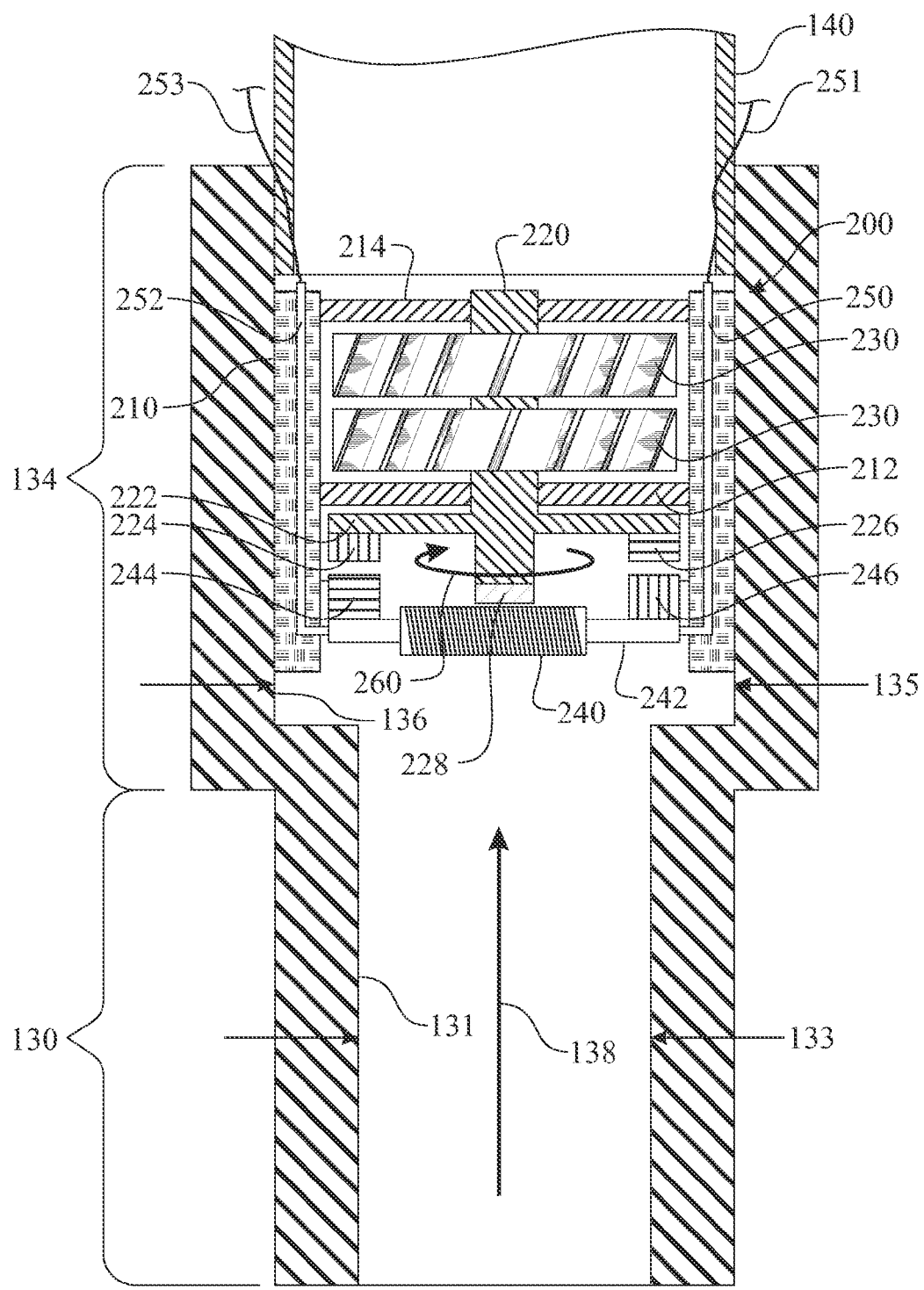
FIG. 3 presents a sectioned view of the exemplary turbine assembly shown installed within a cooling system port of the integrated liquid cooling segment, wherein the turbine assembly is inserted in a first orientation, wherein the section taken along a longitudinal axis thereof.
Figure 4:
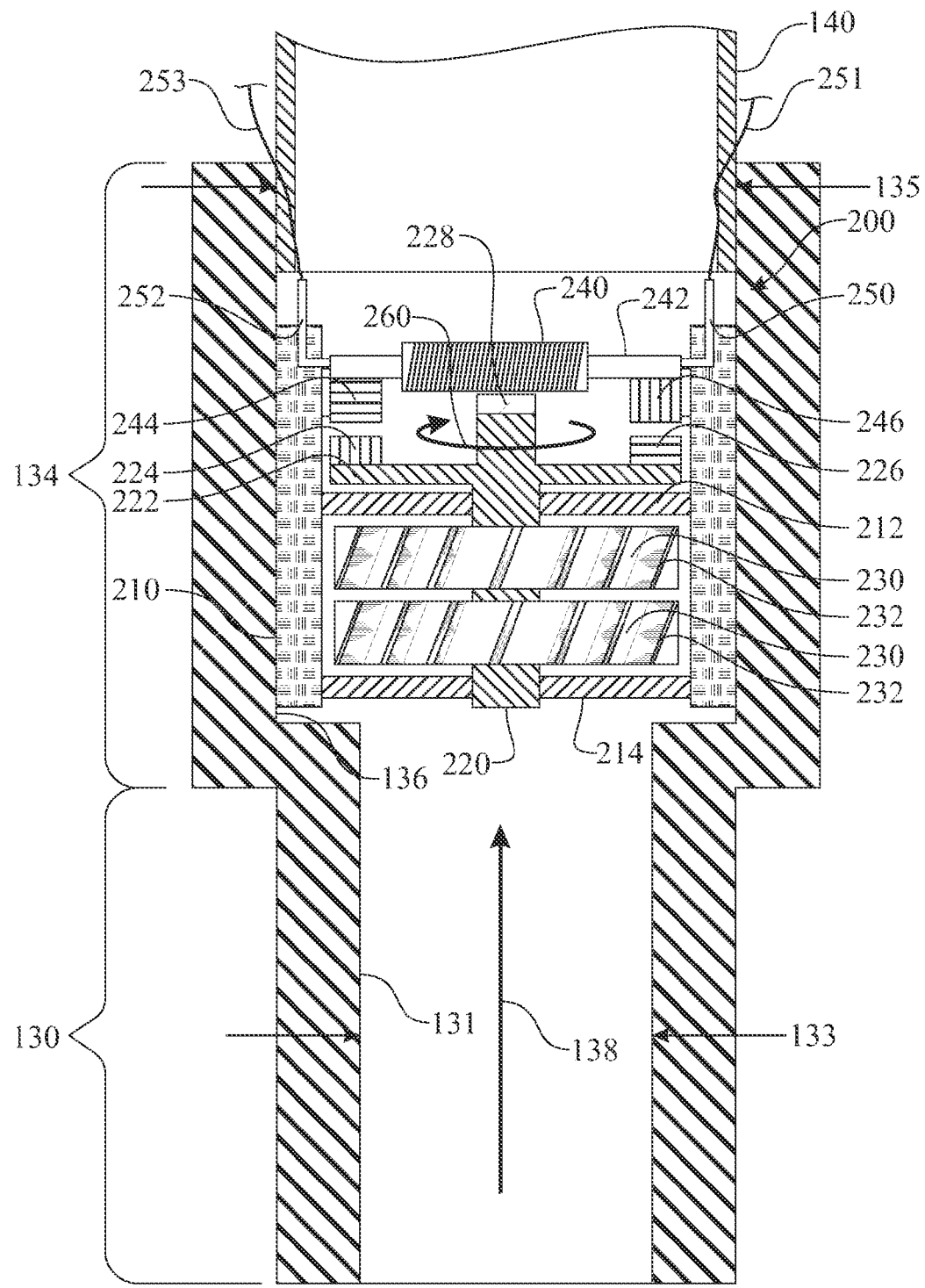
FIG. 4 presents a sectioned view of the exemplary turbine assembly shown installed within a cooling system port of the integrated liquid cooling segment, wherein the turbine assembly is inserted in a second orientation, wherein the section taken along a longitudinal axis thereof.

A power harvesting bearing assembly 100 is illustrated in FIGS. 1 through 3, with an alternative installation configuration being illustrated in FIG. 4. A power harvesting bearing assembly 100 includes a bearing 120 retained within a bearing housing 110 by a bearing receptacle 112. Bearing housings 110 are configured in a variety of form factors, having a multitude of optional configurations. One optional feature is an inclusion of an integrated bearing cooling passage system within the bearing housing 110. The optional integrated bearing cooling passage system provides a thermal transfer system to remove heat generated by the rotation of the bearing and/or other rotating components in contact with the bearing. The integrated bearing cooling passage system includes an integrated liquid cooling segment 130 defining an integrated liquid cooling passage 131 for passing a fluid therethrough in accordance with a fluid flow 138. The integrated bearing cooling system can include a series of coolant passage segments, represented by the integrated liquid cooling segment 130 and a integrated liquid cooling passage continuing segment 132. An exemplary cooling system port 134 is shown at one end of the integrated bearing cooling passage system. It is understood that a cooling system port 134 would be included at each end of the integrated bearing cooling passage system. The first cooling system port 134 functions as a source port and the second cooling system port 134 functions as a return port. In a preferred configuration, a cooling system port diameter 135 of the cooling system port 134 is larger than an integrated liquid cooling passage diameter 133 of the integrated liquid cooling segment 130. The transition between the integrated liquid cooling segment 130 and the cooling system port 134 creates a shoulder.

The exemplary fluid flow 138 flows a cooling fluid towards the exemplary cooling system port 134, where the cooling system port 134 functions as the discharge port. It is understood that the fluid flow 138 can be oriented in either direction, wherein the alternative flow would utilize the exemplary cooling system port 134 as a source port.

A turbine assembly 200 is inserted within the cooling system port 134 for harvesting power from fluid flowing through the integrated bearing cooling passage system. The turbine assembly 200 is oriented with an axis of rotation of each turbine blade subassembly 230 parallel with the fluid flow 138. Details of the turbine assembly 200 are presented in FIGS. 3 and 4 and will be presented below.

The power harvesting bearing assembly 100 can include a condition sensor 150 or other electrically operated component. Electrical power is transferred from the turbine assembly 200 to the condition sensor 150 by connecting supply conductor segments 251, 253 to a condition sensor wiring 152. The condition sensor wiring 152 provides an electrical communication channel between the condition sensor 150 and the supply conductor segments 251, 253. It is understood that the turbine assembly 200 can provide electrical power to sensors 150 and other electrically operated component located in the general vicinity of the power harvesting bearing assembly 100, including bearing sensors located on other bearing assemblies; communication devices (wired or wireless); alarms; data recording devices (including computers, magnetic tape drives, digital recording devices, disc recording devices, and the like); controllers, and the like.

The turbine assembly 200 comprises elements of any electricity generating turbine assembly known by those skilled in the art. The exemplary embodiment of the turbine assembly 200 presented herein illustrates one embodiment to describe various elements, the components inter-relation, and function.

The turbine assembly 200 includes at least one turbine blade subassembly 230 rotationally assembled within a turbine casing 210. Each turbine blade subassembly 230 comprises a plurality of turbine blades 232. The turbine blades 232 are shaped to rotationally drive the turbine blade subassembly 230 when subjected to the fluid flow 138. The turbine blades 232 can be formed in any suitable shape and orientation, including angled, spiraling, and the like. The turbine blade subassembly 230 is assembled within the turbine casing 210 enabling the turbine blade subassembly 230 to rotate about a longitudinal axis of the turbine axle 220. It is preferred that the turbine blade subassembly 230 is affixed to the turbine axle 220, driving rotation of the turbine axle 220 within the turbine casing 210. The turbine axle 220 is supported by at least one turbine axle bushing bracket 212, 214. The exemplary embodiment employs a pair of brackets, more specifically a first turbine axle bushing bracket 212 mounted proximate a turbine blade subassembly 230 and a second turbine axle bushing bracket 214 mounted proximate the turbine blade subassembly 230. Although the exemplary embodiment employs a pair of brackets 212, 214, it is understood that the turbine axle 220 can be rotationally assembled within an interior of the turbine casing 210 using any suitable mounting configuration. A magnet support member 222 is rotationally assembled within the turbine casing 210. The magnet support member 222 is rotationally driven by a rotation of the turbine blade subassembly 230, wherein the rotation is referenced as a turbine subassembly rotation 260. A pair of rotated magnets or magnetic material 224, 226 is carried by the magnet support member 222. The first rotated magnet 224 is carried at a first end of the magnet support member 222 and the second rotated magnet 226 is carried at a second end of the magnet support member 222. An electro-magnetic subassembly is secured within the turbine casing 210. The electro-magnetic subassembly comprises a coil core 242 wrapped within an electrical coil 240. A first coil magnet 244 is carried at a first end of the coil core 242 and a second coil magnet 246 is carried at a second end of the coil core 242. The assembly aligns each of the pair of rotated magnets or magnetic material 224, 226 with the pair of fixed magnets 244, 246. The magnets can be provided in opposing polarity to generate an alternating current. The rotation of the magnet support member 222 passes the rotated magnets or magnetic material 224, 226 across the pair of fixed magnets 244, 246 generating an alternating current. A pair of internal power conductors 250, 252 transfer electrical current from the electrical coil 240, in combination with the power supply conductor segments 251, 253, transfers the electricity to a connector (not shown) for connection with an electrically powered device, such as the condition sensor 150. The turbine axle 220 and magnet support member 222 can be fabricated of any suitable material. It is preferred that the turbine axle 220 and magnet support member 222 are fabricated of non-magnetic materials, such as ceramic material, and the like.

Each end of the turbine casing 210 is open, allowing fluid to flow therethrough. The turbine axle bushing brackets 212, 214 and the coil core 242 are designed to minimize any impact on fluid flow through the turbine casing 210. The magnet support member 222 can be formed having an airfoil shape to increase the efficiency.

Teflon or any other friction reducing material can be employed between the circumference of the turbine blade subassembly 230 and an interior surface of the turbine casing 210 to enhance a seal therebetween without increasing friction.

The distance between the rotated magnets 224, 226 and the pair of fixed magnets 244, 246 directly affects the operation and efficiency of the electrical coil 240. The turbine axle 220 is assembled within the turbine casing 210 to retain the dimensional relationship between the rotated magnets 224, 226 and the pair of fixed magnets 244, 246. One optional design utilizes a Teflon spacer 228 placed between an end of the turbine axle 220 and the electrical coil 240 or coil core 242.

A rectifier can be inserted in electrical communication with the system to convert the alternating current to direct current.

The turbine assembly 200 is inserted within a port coupling counter bore 136 formed in the cooling system port 134. The turbine assembly 200 can be designed to fit the port coupling counter bore 136 having original equipment dimensions or the port coupling counter bore 136 can be enlarged in diameter and/or depth to accommodate the eternal dimensions of the turbine casing 210. The leading edge of the turbine casing 210 butts against the shoulder formed at a transition between the cooling system port 134 and the integrated liquid cooling segment 130. A cooling source connector 140 is assembled to the cooling system port 134 using any suitable fluid sealing mechanical connection. Examples of suitable fluid sealing mechanical connections include a bonded slip fitting (as shown), a threaded connection, a quick disconnect connection, and the like. The power supply conductor segments 251, 253 exit from the interior of the cooling system port 134 using any known fluid sealing port. In one embodiment, the turbine assembly 200 can include features to become an integral fitting or adapter between the cooling source connector 140 and the cooling system port 134. The power supply conductor segment 251, 253 would exit through the turbine casing 210 at a location between the cooling system port 134 and the cooling source connector 140.

The installation illustrated in FIG. 3 orients the turbine blade subassembly 230 proximate the exterior surface of the turbine casing 210 and trailing the electro-magnetic subassembly respective to the fluid flow 138. Conversely, the installation illustrated in FIG. 4 orients the electro-magnetic subassembly proximate the exterior surface of the turbine casing 210 and trailing the turbine blade subassembly 230 respective to the fluid flow 138.

The components of the turbine assembly 200 can be treated for consideration of their working environment. Since the turbine assembly 200 will be subjected to flowing fluid, the electrical components are treated accordingly, such as being potted, coating with a conformal coating, and the like to avoid corrosion and/or premature failure to ensure long term reliability.

One skilled in the art can appreciate that the present invention can be adapted to a liquid or gas cooling system. The system can be operated using medium pressure and medium flow rates to harvest enough energy to power the condition sensor and other low power devices.

The design of the turbine assembly 200 can be optimized for efficiency based upon the application.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

| Ref. No. | Description |
|---|---|
| 100 | power harvesting bearing assembly |
| 110 | bearing housing |
| 112 | bearing receptacle |
| 120 | bearing |
| 130 | integrated liquid cooling segment |
| 131 | integrated liquid cooling passage |
| 132 | integrated liquid cooling passage continuing segment |
| 133 | integrated liquid cooling passage diameter |
| 134 | cooling system port |
| 135 | cooling system port diameter |
| 136 | port coupling counter bore |
| 138 | fluid flow |
| 140 | cooling source connector |
| 150 | condition sensor |
| 152 | condition sensor wiring |
| 200 | turbine assembly |
| 202 | turbine insertion |
| 210 | turbine casing |
| 212 | first turbine axle bushing bracket |
| 214 | second turbine axle bushing bracket |
| 220 | turbine axle |
| 222 | magnet support member |
| 224 | first rotated magnet |
| 226 | second rotated magnet |
| 228 | Teflon spacer |
| 230 | turbine blade subassembly |
| 232 | turbine blades |
| 240 | electrical coil |
| 242 | coil core |
| 244 | first coil magnet |
| 246 | second coil magnet |
| 250 | first internal power conductor |
| 251 | first power supply conductor segment |
| 252 | second internal power conductor |
| 253 | second power supply conductor segment |
| 260 | turbine subassembly rotation |

What is claimed is:

1. A power generating bearing assembly, the power generating bearing assembly comprising:
    a bearing;
    a bearing housing comprising:
        a bearing receptacle, and
        an integrated bearing cooling passage system comprising at least one integrated liquid cooling passage;
    a turbine assembly comprising:
        a turbine casing,
        a turbine shaft assembled within the turbine casing,
        a turbine blade subassembly rotationally carried by the turbine shaft, and
        an electrical generator in operational engagement with the turbine blade subassembly, wherein rotational motion of the turbine blade subassembly causes the electrical generator to generate electrical power; and
    wherein the turbine assembly is integrated within the liquid cooling passage and converts energy provided by fluid flowing through the liquid cooling passage to electrical energy.

2. The power generating bearing assembly as recited in claim 1, wherein the electrical generator further comprises a magnet support member in rotational connection with the turbine blade subassembly;
    at least one rotated magnetic element carried by the magnet support member; and
    an electrical coil having a series of coil windings circumscribing a coil core 242, wherein the coil core is in magnetic communication with the at least one rotated magnetic element, and
    wherein when an interaction between the at least one rotated magnetic element and the coil core causes the electrical coil to generate an electrical output.

3. The power generating bearing assembly as recited in claim 2, wherein the electrical generator further comprises at least one coil magnet carried by the coil core.

4. The power generating bearing assembly as recited in claim 1, wherein the at least one integrated liquid cooling passage further comprises a cooling system port, and
    wherein the turbine assembly is inserted into the cooling system port.

5. The power generating bearing assembly as recited in claim 4, wherein an interior diameter of the cooling system port is larger than an interior diameter of the integrated liquid cooling segment.

6. The power generating bearing assembly as recited in claim 5, wherein the cooling system port is an inlet cooling system port.

7. The power generating bearing assembly as recited in claim 5, wherein the cooling system port is a discharge cooling system port.

8. The power generating bearing assembly as recited in claim 5, wherein one end of the turbine assembly is seated against a shoulder formed at a transition between the integrated liquid cooling segment and the cooling system port.

9. The power generating bearing assembly as recited in claim 4, wherein the cooling system port is an inlet cooling system port.

10. The power generating bearing assembly as recited in claim 4, wherein the cooling system port is a discharge cooling system port.

11. The power generating bearing assembly as recited in claim 1, wherein the bearing housing (110) is sealed within the integrated bearing cooling passage system.

\* \* \* \* \*